May 16, 1933.　　　H. A. SALLOP　　　1,909,901
REMOVABLE AUTOMOBILE SEAT COVER
Filed Aug. 31, 1929　　　2 Sheets-Sheet 1
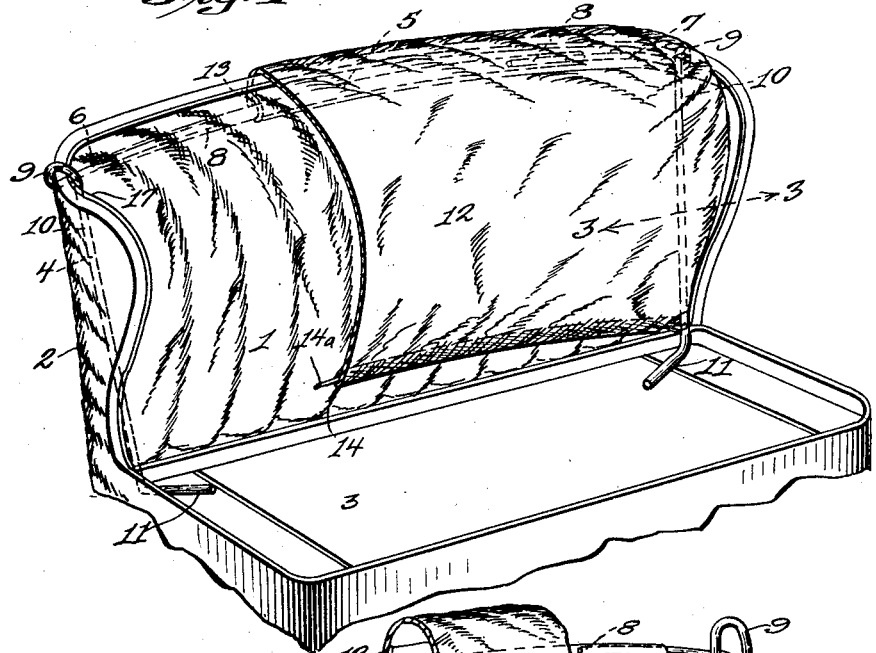
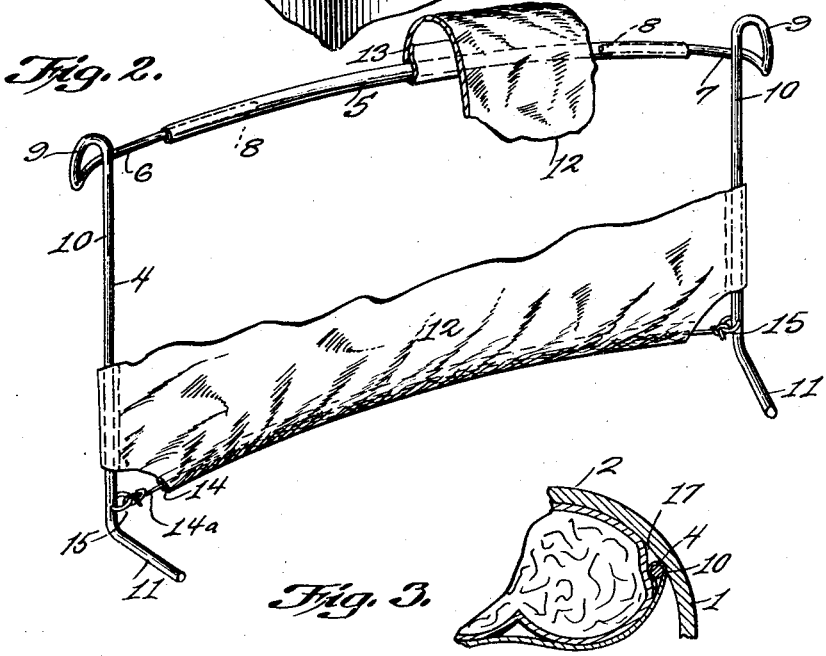
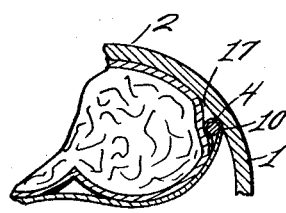
INVENTOR
Harry A. Sallop
BY Wm R Smith
ATTORNEY

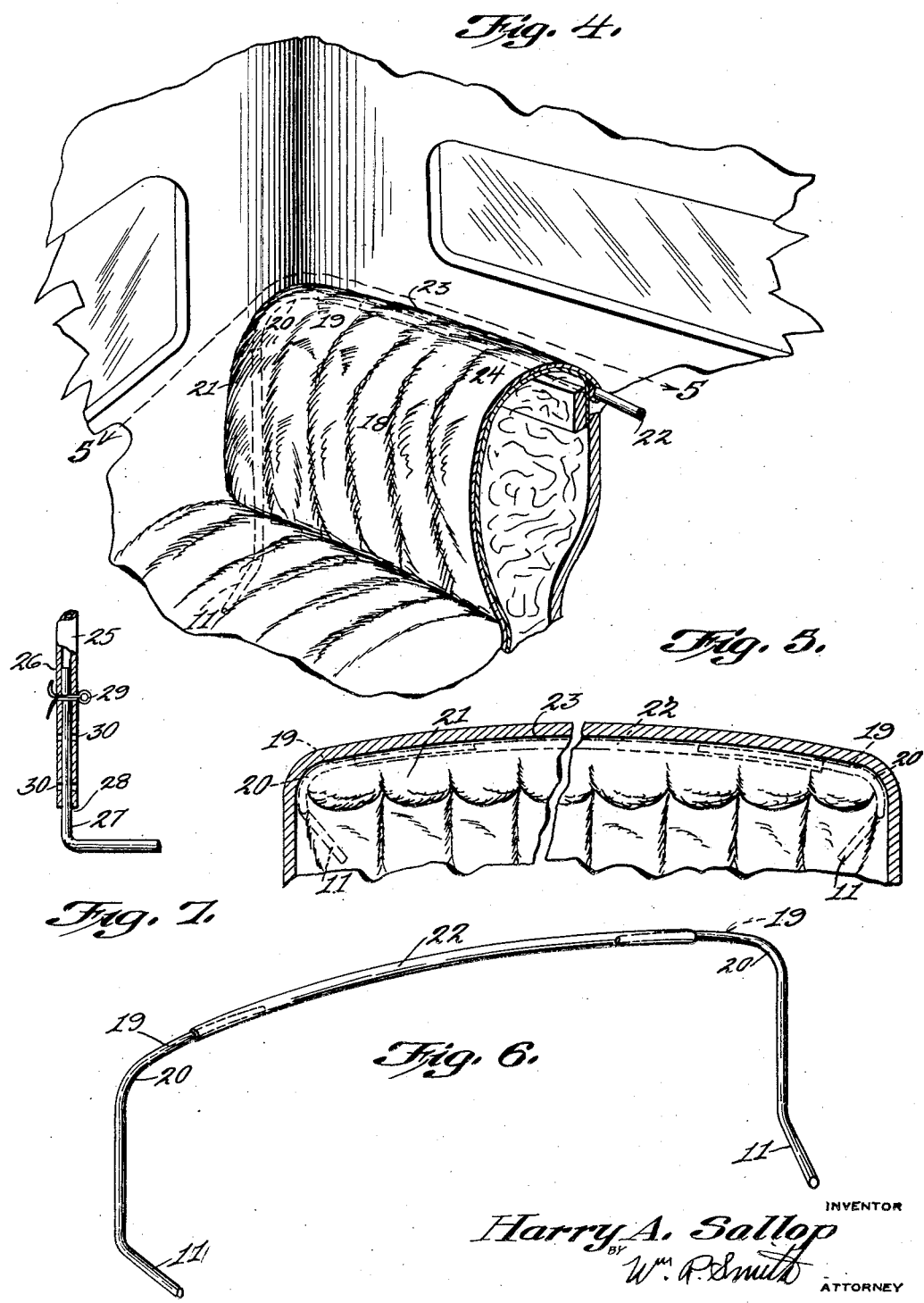

Patented May 16, 1933

1,909,901

UNITED STATES PATENT OFFICE

HARRY A. SALLOP, OF NEW YORK, N. Y.

REMOVABLE AUTOMOBILE SEAT COVER

Application filed August 31, 1929. Serial No. 389,635.

This invention relates to automobile seat covers and has for its primary object the provision of seat covers that may be more quickly and effectively applied to automobile seats and in a manner that securing elements directly mounted in the body of the structure of the automobile are dispensed with.

An object of the invention is a construction of seat cover that may be effectively applied to a seat by an inexperienced person, due to the fact that the design of the supporting means of the seat cover is such that the same will automatically move into required position in the application of the seat cover.

Another object of the invention is the design of an attaching frame that will accommodate variations in size and contour of automobile seats so as to provide a universal type of cover adaptable to all makes of automobiles.

A feature of the invention resides in the construction of a seat cover that has a direct interlocking connection with the seat structure, without the use of attaching elements and so cooperative with the seat structure that the effective grip between the cover and the seat structure is increased proportionately to the strains to which the seat cover is subject in the use thereof.

Besides the above my invention is distinguished in the use of an extensible frame so constructed that the same will have interlocking engagement with the top portion of the seat, the side portions of the seat and the bottom portion of the seat, thereby assuring a rigid connection and one that will assure a taut arrangement of the cover section over the upholstery of the seat.

Another feature of the invention resides in the use of a collapsible frame for minimizing space during shipment and further enable quick detachment of the frame from the cover section when it is necessary to clean the latter.

With these and other objects in view, the invention will be better understood from the following detailed description taken in connection with the following detailed drawings, wherein:

Figure 1 is a fragmentary perspective view of an automobile seat structure having the cover applied thereto, Figure 2 is a perspective view of the cover removed with parts in section, Figure 3 is a sectional view on line 3—3 of Figure 1, Figure 4 is a perspective view partly in section of a rear automobile seat showing my improved cover applied thereto, Figure 5 is a horizontal sectional view on the line 5—5 of Figure 4, Figure 6 is a perspective view of the supporting frame for the back seat of the automobile.

Figure 7 is a sectional view of a modification of my invention.

Again referring to the drawings illustrating two of the many forms of my invention, it will be noted that one is designed to conform to and have interlocking engagement with the front seat of an automobile and the other designed to conform to and interlock with the rear seat of an automobile. The basic features of the two forms illustrated are basically alike, varying slightly in details so as to enable the same to properly conform to the slight variations in shape and size of the front and rear seat structure of an automobile.

My improved seat cover for the front seat 1 which includes the back structure 2 and bottom structure 3, is of a design to have an effective direct interlocking engagement with the seat structure without the use of a single securing element directly mounted in the body structure of the automobile. This desired objective is accomplished by designing the supporting means for the seat cover in the form of a frame 4 made up of a plurality of sections adjustably related so as to accommodate various size seats and further to bring about a more effective interlocking engagement. In the particular showing the frame illustrates as consisting of a cross tube 5, the end portions of which are slidably related with the side bars 6 and 7 each provided with an extension 7 directly slidable in the end of the cross tube 5. Thus it will be appreciated that the side bars can be moved toward and away from each other for accommodating variations in the width of the various types of automobile seats.

To enable the frame to be brought into direct interlocking engagement with the seat structure I have shaped each side bar in a manner to provide a hook portion 9, a shank 10 and a foot 11, the latter extended at right angles to the shank 10 so as to be directly engaged by the cushion of the bottom structure 3, thereby holding the hook portion 9 in tight interlocking engagement with the upper portion of the seat, with the advantage that upon removal of the seat cushion the frame may be quickly moved out of engagement with the outer edge of the seat structure.

The cover section 12 is provided with a seam 13 extending around three sides of the cover and directly receiving therein the frame 4 with the result that the cover section is effectively held in a somewhat set up position for a quick placement over the automobile seat, the seam completely covering the exposed parts of the frame for accomplishing a neat appearance.

The cover section is provided with another seam 14, in which is mounted a securing element which may be in the form of an elastic cord 14ª, having its ends attached to rings 15, carried by side bars whereby fixing the position of the cover section on the frame and at the same time allowing the cover section to be readily removed by the untying of the cord 14ª. Particular attention is called to the fact that the seam 14 is cut on an arc of a circle so that in the tightening of the cord 14ª the cover section will be tightly drawn across the irregular outline of the seat structure for accomplisha neat fit. As far as I have proceeded it will be appreciated that with the cover section 12 mounted upon the supporting frame, the cover may be quickly and effectively secured to the seat by mounting the hook portions 9 over the upper edge portion of the seat for disposing the cross tube at the back of the seat in parallel relation therewith. When this has been accomplished it is a very simple operation to swing the shanks 10 into the recesses 17 arranged at the ends of the seats in the formation of the upholstery of the automobile and this operation not only brings about a more effective interlocking engagement between the frame and the seat structure, but automatically draws the cover section taut over the upholstery of the seat for producing a very neat fit, accomplishing this objective in a manner that the seam of the cover is disposed in its most advantageous position, so as not to detract from the ornamentation of the seat structure.

It will now be appreciated that when the shanks 10 have been fully forced into the recesses 17, the feet 11 of the side bars are properly disposed to be effectively engaged by the bottom seat cushion when the same is arranged in place. As there is an interlocking engagement between the feet 11 and the seat cushion, between the shanks 10 and the end portion of the seat, and between the hook portions 9 and the upper edge portions of the seat, it will be appreciated that the frame is rigidly held in place and positively cannot be displaced in the customary use of the seat cover, this result being greatly facilitated by the arrangement of the component parts which enables an increase in the effective engagement between the parts in proportion to the strain to which the cover is subjected. That is to say, when the cover section 12 is subject to a strain downwardly, this strain is utilized to force the frame into tighter interlocking engagement with the upper edge portion of the seat and when the cover section 12 is subject to a strain upwardly, this increases the interlocking engagement between the feet 11 and the under surface of the bottom seat cushion.

Due to the arrangement of the cord 14ª and its curved formation, the cover section is tightly drawn over the upholstery of the seat and besides the cover section is prevented from displacement upon the frame in a manner that the cover section may be quickly removed from the frame for cleaning purposes.

As the cross bar has sliding relation with the end bars, and the end bars are designed in a unique manner to interfit with various types of automobile seats, it will be appreciated that I have provided a universal type of seat cover that may be quickly applied in place.

The supporting frame for the rear cover section 18 is basically the same as that described with relation to the front cover section with the exception that the end bars 19 are not provided with hook portions, utilizing curved extensions 20 interfitting with the curved ends of the back seat structure 21. Particular attention is called to the fact that the cross tube 22 is of a size and configuration to be neatly seated in the usual depression 23 formed at the junction of the upper portion of the automobile seat and the back of the automobile body and as the side bars are effectively held within the recesses at the end of the seat structure and the feet of the side bar interlock with the under surface of the bottom seat cushion, it can be readily understood that the cross tube 22 is positively held seated within the depression for the prevention of displacement of the cover section 24. As the lower edge portion of the cover section 21 is secured to the side bars in the manner as illustrated in Figure 2 of the drawings, it will be appreciated that a neat taut arrangement of the cover section is assured at all times, irrespective of the strains to which the cover section is subject in the use thereof. Attention is also called to the fact that in the application of the cover section 24, it is only necessary to mount the tube 22 in the depression 23 utilizing this point of connection as a fulcrum for the swinging of the side bars 19 into the recesses of the seat structure for drawing the cover section 24 tightly across the upholstery of the seat. When this has been accomplished the feet of the frame have been so disposed as to be effectively engaged by the bottom seat cushion for preventing displacement of the parts.

As the component parts of the two types of frames illustrated are extensible for accommodating different widths of automobile seats, it may be advisable to construct the side bars for extension, and to accomplish this desired objective I have illustrated in Figure 7 a side bar 25 consisting of companion sections 26 and 27 having a telescopic connection with each other as illustrated at 28 and adapted to be held in adjusted position by the pin 29 interchangeably related with the holes 30 in the two sections.

From the foregoing description taken in connection with the accompanying drawings, it will be appreciated that I have designed a type of automobile seat cover that may be very quickly and effectively placed over various types of seat structures now in use and when in place will be effectively held against displacement due to the unique interlocking engagement with various parts of the automobile seat. These desired objectives are accomplished in a novel manner which enables the dispension of all securing elements, a feature not characteristic of any seat cover heretofore developed and marketed. The very fact that I dispense with various types of fastening elements greatly facilitates the application of seat covers, irrespective of the body design of the automobile or the type of material utilized in the construction thereof.

As the frames are in set up position and the cover sections are directly carried thereby it will be appreciated that the various parts automatically fall into the required relation with the various parts of a seat in the application thereof, a decided advantage when taking into consideration that seat covers are usually applied by an unskilled person.

It is of course to be understood that the invention may be constructed in various other manners than illustrated and the frames designed in various other shapes and therefore I do not desire to be limited in any manner whatsoever except as set forth in the following claims.

What I claim is:

1. A cover for the back rest of an automobile seat whose side portions contact the upholstery of the side walls of the automobile body comprising a cover section, a supporting frame removably connected to the cover section, said frame shaped to have a portion extend across and contact with the back surface of the upper portion of the said back rest, and portions insertable between said upholstery and the side portions of the automobile seat.

2. A cover for the back rest of an automobile seat whose side portions contact the upholstery of the side walls of the automobile body comprising a cover section, a supporting frame removably connected to the cover section, said frame shaped to have a portion extend across and contact with the back surface of the upper portion of the said back rest, and portions insertable between said upholstery and the side portions of the automobile seat, and means for drawing the cover section tight over the seat when said frame has been arranged in place.

3. In combination with an automobile seat having a back structure and a bottom structure, and provided with recesses at the ends thereof, a seat cover comprising a cover section and a supporting frame therefor having hook portions engaging over said back structure and portions insertable into said recesses for drawing the cover section taut across the back structure.

4. In combination with an automobile seat having a back structure and a bottom structure, and provided with recesses at the ends thereof, a seat cover comprising a cover section and a supporting frame therefor having a cross member adapted to be hooked over said back structure and shank portions insertable into said recesses for drawing the cover section taut across the back structure, and means for bringing about an interlocking connection between the frame and said bottom structure.

In witness whereof I have hereunto set my hand.

HARRY A. SALLOP.